Figure 1:
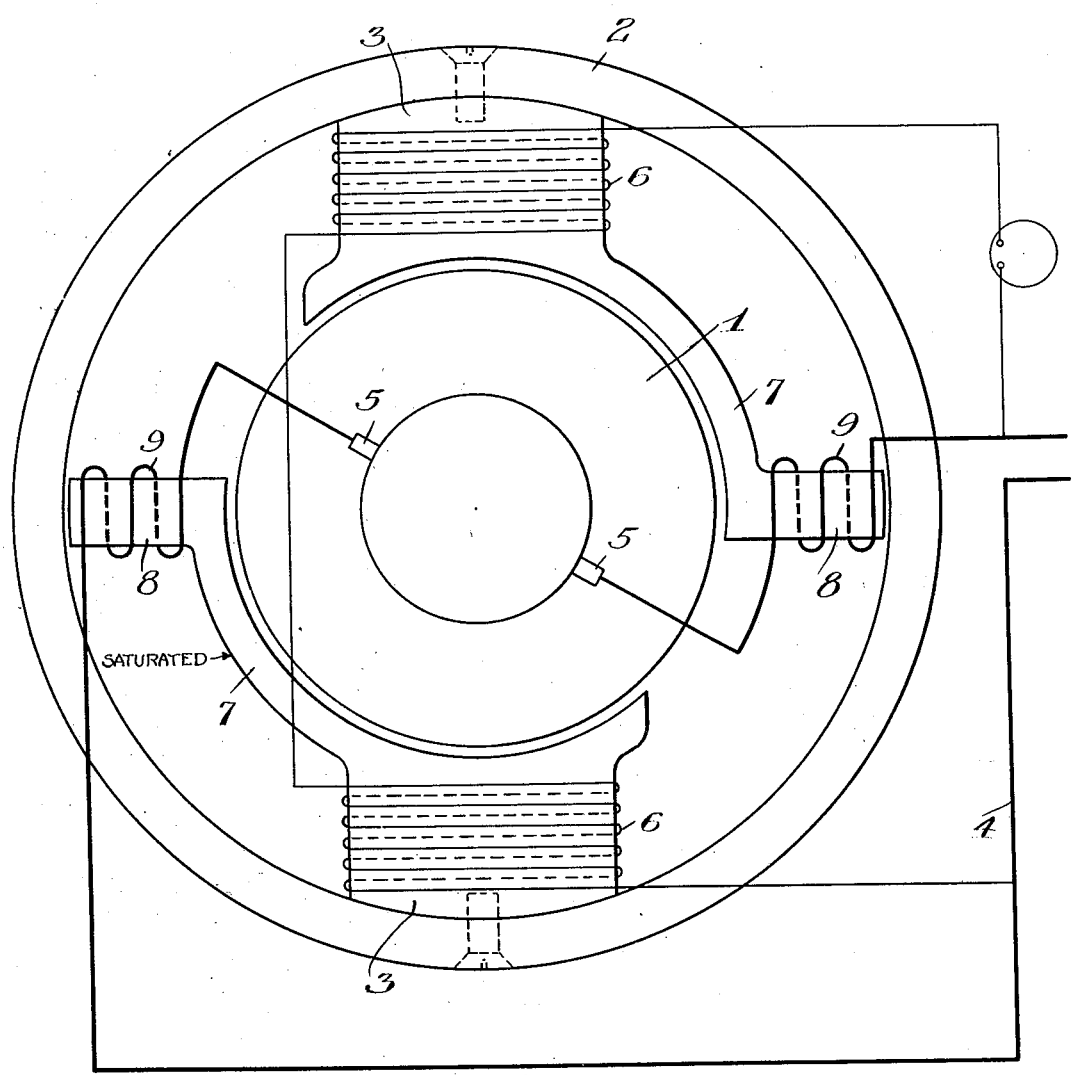

Jan. 5, 1926.

E. D. SMITH 1,568,478

GENERATOR

Filed Oct. 22, 1923

INVENTOR.
Erasmus D. Smith
BY Harold E. Stonebraker
his ATTORNEY

Patented Jan. 5, 1926.

1,568,478

UNITED STATES PATENT OFFICE.

ERASMUS D. SMITH, OF ROCHESTER, NEW YORK.

GENERATOR.

Application filed October 22, 1923. Serial No. 670,039.

*To all whom it may concern:*

Be it known that I, ERASMUS D. SMITH, a citizen of the United States of America, residing at Rochester, in the county of Monroe and State of New York, have invented certain new and useful Improvements in Generators, of which the following is a specification.

My invention relates to a generator, and has for its principal object to afford a simple, practicable and efficient mechanism which can be operated economically for the charging of storage batteries and other analogous uses.

A more particular purpose of the invention is to provide a direct current generator that will maintain a substantially constant voltage at its terminals, and which is effectually protected against injury, in the event of failure of power from the motor that drives the generator, or a decrease in the generator voltage below that of the line to which it is connected.

A further object of my improvement is to automatically increase the field strength of the generator as the load on the generator increases, by a mechanism that positively prevents a reversal of the magnetism in the field, in the event of reversal of current in the main generator circuit.

Another purpose of the invention is to provide for increases in the generator field strength as the load increases, while preventing decreasing the field strength beyond a predetermined fixed point, that is but slightly below normal, so that no substantial decrease in field strength takes place if the generator should run as a motor supplied by current from the battery being charged, or other source.

Specifically, the invention has for its object to afford a magnetic by-pass or diverting instrumentality extending from each pole piece partially around the armature and thence toward the frame, and to control said by-pass from the main generator circuit in such a way as to vary the amount of leakage therethrough, causing more magnetism to pass through the armature as the load is increased, the by-pass being constructed and arranged so as to cause the generator to operate at a safe speed when operating as a motor.

The invention is based upon the principles characterizing the mechanism that will be understood from the following description, when read in conjunction with the accompanying drawing, the novel features being pointed out in the claims following the description.

Figure 2:
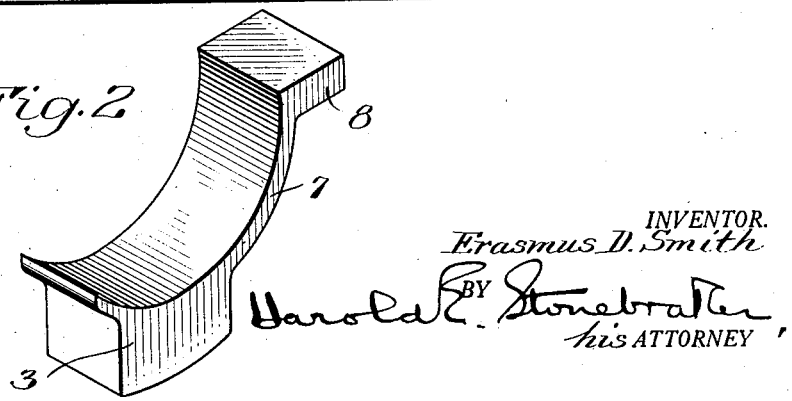

In the drawing:

Figure 1 is a diagrammatic view illustrating one adaptation of the invention, and Figure 2 is a perspective view of the pole piece and integral diverter pole.

There are numerous ways in which the features of my improvement can be carried out, and for purpose of illustration of one example of a practicable mechanism, I have disclosed a direct current generator such as used for a storage battery charging outfit.

In the construction shown, 1 designates the armature which is rotated by a suitable motor, as well understood in the art, while 2 designates a stationary frame constituting part of the field, 3 designating the pole pieces of the field supported on the frame 2, as usual in this class of structures. 4 is the main generator circuit connecting with brushes 5 to the armature and leading to the batteries to be charged, while 6 are coils connected with the main circuit and surrounding the pole pieces 3.

The generation of current depends upon the passing of magnetic lines of force between the pole pieces 3 through the armature 1, and my invention is based upon the discovery that these magnetic lines of force may be partially diverted around the armature instead of passing through it, and the extent or amount of such diversion of magnetism can be controlled automatically so as to increase the magnetism passing through the armature as the load increases, and decrease it as the load decreases.

One practicable and successful way of accomplishing this result consists of a magnetic by-pass in the form of an extension 7, preferably formed of iron or steel, integral with each pole piece 3, and extending partially around the armature, as shown. The end of the extension 7 projects outwardly towards the frame, preferably to a point in close proximity thereto affording a diverter pole 8 around which is wound a coil 9 in series with the main circuit 4, so that the generated current in the main circuit continuously passes through the coil 9 of each diverter pole.

Current travels normally through the coils 9 in such a direction as to oppose the force causing leakage through the diverter poles, so that as the current increases, it causes a greater amount of magnetism to pass through the armature, and maintains a practically constant voltage at the terminals 5. Preferably, the diverter pole is so designed that the amount of magnetism diverted by it at no load is such that when redirected through the armature upon increased load, it will cause the generated voltage to equal the terminal voltage plus the internal voltage drop.

The cross section and arrangement of portion 7 of the diverter pole is such that when the generator is operating normally with no load, considerable magnetism is passing through the diverter pole and portion 7 is near its point of saturation. Therefore very little additional magnetism need be diverted to bring it to complete saturation, after which the diverter pole will divert substantially no additional magnetism from its path to the armature. The amount of magnetism passing through portions 8 of the diverter poles can be very considerably reduced, however, in order to strengthen the main field upon increasing load conditions, and the reasons for these conditions will now be explained.

If the generator speed is decreased, owing to a change in speed or entire failure of the motor which drives the generator, the generator voltage drops proportionately, and this drop is sometimes such as to result in the generator voltage being lower than that of the battery being charged, whereupon the latter drives the generator as a motor.

Under these conditions, the current in the main generator circuit is reversed, and it is essential that this shall not have the effect of substantially weakening the magnetism in the main field to the point of permitting the armature to turn at an excessive speed. With the construction described above, the diverter pole prevents the main magnetic field strength from being substantially decreased when the main current reverses, since portion 7 quickly reaches a point of complete saturation, after which practically no further leakage occurs, irrespective of the amount of current in the diverter pole coil.

Under these conditions, the main magnetic field strength is held at such a point as to cause the generator to run as a motor without excessive speed and without doing any injury. As soon as the generator driving motor resumes operations, or returns to normal speed, the generator voltage increases to a point above that of the battery, and again functions normally. While charging, a practically constant voltage at the generator terminals is assured, because as the generated current increases, the amount of magnetism passing through portion 8 of the diverter poles is decreased, and that passing to the armature correspondingly increased, so that the field strength is increased proportionately to an increase of current in the main generator circuit.

While I have described the invention with reference particularly to a certain structural embodiment, it is not confined to battery charging or to any of the details shown, and my improvements may be practicably adopted in other modified arrangements without departing from the principles of the improvements, or the scope of the following claims.

I claim:

1. A generator comprising a field including a frame and pole pieces, an armature, diverting means arranged to divert magnetism from the pole pieces around the armature instead of through it, and means acting automatically to vary the amount of magnetism so diverted in accordance with changes in the amount of generated current, said diverting means being so constructed that there is no substantial increase in diverted magnetism and no substantial decrease in the main field strength upon reversal of current when the generator acts as a motor, whereby the generator may safely operate as a motor without excessive speed.

2. A generator comprising a field including a frame and pole pieces, an armature, diverting means arranged to divert magnetism from the pole pieces around the armature instead of through it, and current-controlled means acting to vary the amount of magnetism so diverted, said diverting means being so constructed that there is no substantial increase in diverted magnetism and no substantial decrease in the main field strength upon reversal of current when the generator acts as a motor, whereby the generator may safely operate as a motor without excessive speed.

3. A generator comprising a field including a frame and pole pieces, an armature, diverting means arranged to divert magnetism from the pole pieces around the armature instead of through it, and a main circuit cooperating directly with said diverting means and acting to vary its reluctance in accordance with changes in the amount of generated current, said diverting means being so constructed that there is no substantial increase in diverted magnetism and no substantial decrease in the main field strength upon reversal of current when the generator acts as a motor, whereby the generator may safely operate as a motor without excessive speed.

4. A generator comprising magnetism diverting means controlled by the generated current for increasing the field strength proportionately to the increase in current and preventing substantial reduction in the magnetism in the main field upon reversal of current in the main line whereby the generator may operate as a motor without excessive speed.

5. A generator comprising a field including a frame and pole pieces, an armature, a magnetic by-pass extending partially around the armature from the inner end of each pole piece to a spaced point on the frame, and current controlled means for varying the reluctance of said by-pass.

6. A generator comprising a field including a frame and pole pieces, an armature, a magnetic by-pass extending partially around the armature from the inner end of each pole piece to a spaced point on the frame, and current controlled means acting upon said by-pass to increase the main field strength proportionately to an increase in current, said by-pass being magnetically saturated whereby a substantial decrease in the main field strength is prevented upon reversal of current in the main line.

7. A generator comprising a field including a frame and pole pieces, an armature, a magnetic by-pass extending partially around the armature from the inner end of each pole piece to a spaced point on the frame, and current controlled means acting upon said by-pass to increase the main field strength proportionately to an increase in current, said by-pass having a restricted section so located that said current controlled means acts to redivert the leakage magnetism across the air gap to the armature but will not substantially reduce the magnetism in said main field upon reversal of current in said current controlled means.

8. A generator comprising a field including a frame and pole piece, an armature, a diverter pole connected with said pole piece and extending partially around the armature and thence towards the frame, and current controlled means for varying the reluctance of said diverter pole.

9. A generator comprising a field including a frame and pole piece, an armature, a diverter pole connected with said pole piece and extending partially around the armature and thence towards the frame, a main circuit, and a coil surrounding said diverter pole and connected in series with the main circuit.

10. A generator comprising a field including a frame and pole pieces, an armature, a diverter pole formed integral with each pole piece and projecting partially around the armature and thence towards the frame, a main circuit, and a coil in series with said main circuit and surrounding each diverter pole.

In witness whereof, I have hereunto signed my name.

ERASMUS D. SMITH.